(12) United States Patent  
Swafford

(10) Patent No.: US 7,730,453 B2
(45) Date of Patent: Jun. 1, 2010

(54) RUNTIME DETECTION FOR INVALID USE OF ZERO-LENGTH MEMORY ALLOCATIONS

(75) Inventor: Michael Luther Swafford, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1204 days.

(21) Appl. No.: 11/300,227

(22) Filed: Dec. 13, 2005

(65) Prior Publication Data

US 2007/0136547 A1   Jun. 14, 2007

(51) Int. Cl.
G06F 9/44 (2006.01)
G06F 12/00 (2006.01)
G06F 13/00 (2006.01)
G06F 9/26 (2006.01)
G06F 11/00 (2006.01)

(52) U.S. Cl. .......... 717/124; 717/127; 717/128; 717/129; 717/125; 717/131; 711/103; 711/130; 711/170; 711/129; 711/206; 714/35; 714/57

(58) Field of Classification Search .......... 717/129, 717/127, 128, 170, 144; 711/130, 103, 170, 711/206, 129; 714/35, 57
See application file for complete search history.

(56) References Cited

U.S. PATENT DOCUMENTS

| 4,680,700 | A | * | 7/1987 | Hester et al. | 711/206 |
|---|---|---|---|---|---|
| 5,335,344 | A | | 8/1994 | Hastings | 395/575 |
| 5,581,697 | A | * | 12/1996 | Gramlich et al. | 714/35 |
| 5,590,329 | A | * | 12/1996 | Goodnow et al. | 717/144 |
| 5,802,604 | A | * | 9/1998 | Stewart et al. | 711/206 |
| 5,909,580 | A | | 6/1999 | Crelier et al. | 395/705 |
| 5,953,530 | A | * | 9/1999 | Rishi et al. | 717/127 |
| 6,115,544 | A | * | 9/2000 | Mueller | 714/57 |
| 6,363,467 | B1 | | 3/2002 | Weeks | 711/170 |
| 6,658,652 | B1 | * | 12/2003 | Alexander et al. | 717/128 |
| 6,697,971 | B1 | | 2/2004 | Dwyer | 714/54 |
| 6,862,674 | B2 | | 3/2005 | Dice et al. | 711/170 |
| 6,931,571 | B2 | | 8/2005 | Bernadet et al. | 714/25 |
| 7,512,765 | B2 | * | 3/2009 | Kurtz | 711/170 |
| 2003/0074650 | A1 | * | 4/2003 | Akgul et al. | 717/129 |
| 2004/0123069 | A1 | * | 6/2004 | Franaszek et al. | 711/206 |
| 2005/0108736 | A1 | * | 5/2005 | Schwabe et al. | 719/331 |
| 2005/0114843 | A1 | | 5/2005 | Gilgen et al. | 717/127 |
| 2005/0144412 | A1 | | 6/2005 | Swafford et al. | 711/170 |
| 2007/0204261 | A1 | * | 8/2007 | Fetzer et al. | 717/163 |
| 2009/0150601 | A1 | * | 6/2009 | Conley | 711/103 |

OTHER PUBLICATIONS

Zhou et al, "Dynamic Tracking of Page Miss Ratio Curve for Memory Management", Oct. 9-13, 2004. ACM, pp. 177-188.*

Kowshik et al, "Ensuring Code Safety Without Runtime Checks for Real-Time Control Systems", Oct. 8-12, 2002, ACM, pp. 288-297.*

(Continued)

*Primary Examiner*—Wei Y Zhen
*Assistant Examiner*—Charles Swift
(74) *Attorney, Agent, or Firm*—Woodcock Washburn LLP

(57) ABSTRACT

Methods for handling zero-length allocations are disclosed. An example of such a method may include returning a self-describing/diagnosing dynamic address that has all the properties required for a secure implementation. Another example may include returning a series of different addresses (instead of a single address per process) to improve supportability. Yet another example may include maintaining diagnostic information about the original allocation for ease of problem resolution.

11 Claims, 4 Drawing Sheets

OTHER PUBLICATIONS

Biswas et al, "Memory Overflow Protection for Embedded Systems Using Run-Time Checks, Reuse, and Compression", ACM Transactions on Embedded Computing Systems, vol. 5, No. 4, Nov. 2006, pp. 719-752.*

Chilimbi et al, "Low-Overhead Memory Leak Detection Using Adaptive Statistical Profiling", Oct. 9-13, 2004, pp. 156-164.*

Chilimbi, T. et al., "Designing a Trace Format for Heap Allocation Events", *ISMM*, 2000, 35-49, http://www.cs.purdue.edu/homes/hosking/ismm2000/papers/chilimbi.pdf.

Chilimbi, T.M. et al., "Low-Overhead Memory Leak Detection using Adaptive Statistical Profiling", *ASPLOS*, 2004, 156-164, http://portal.acm.org/ft_gateway.cfm?id=1024412&type=pdf&coll=GUIDE&dl=GUIDE&CFID=60230855&CFTOKEN=91476997.

Evans, D., "Static Detection of Dynamic Memory Errors", *PLDI*, 1996, http://www.cs.virginia.edu/~evans/pubs/pldi96.pdf, 44-53.

Serrano, M. et al., "Understanding Memory Allocation of Scheme Programs", © Hewlett-Packard Company, 2000, http://www.hpl.hp.com/techreports/2000/HPL-2000-62.pdf, 14 pages.

* cited by examiner

```
0:000> dc 0040aff8
0040aff8  ???????? ???????? 45522121 454d4441  ??????!!README
0040b008  45202d20 4d484358 5a204d45 204f5245   - EXCHMEM ZERO
0040b018  45545942 4c4c4120 5441434f 204e4f49  BYTE ALLOCATION
0040b028  4c50202d 45534145 564e4920 49545345   - PLEASE INVEST
0040b038  45544147 00000000 00000000 00000000  IGATE...........
0040b048  00000000 00000000 00000000 00000000  ................
0040b058  00000000 00000000 00000000 00000000  ................
0040b068  00000000 00000000 00000000 00000000  ................
```

RUNTIME DETECTION FOR INVALID USE OF ZERO-LENGTH MEMORY ALLOCATIONS

BACKGROUND

Memory allocations have the behavior that they return a pointer to memory that can be read from and written to for a requested length. Additionally, such a pointer can be passed into another memory allocation routine, like "realloc" or "free," for example.

A zero-length allocation is a special case. Because the requested length is zero bytes, an attempt should not be made to read from or write to the memory. Existing C/C++ code that treats zero-length allocations as a completely normal part of the process flow is pervasive. However, incorrect use of these zero-length allocations can be a source of software defects that are difficult to track down. Traditional implementations tend to present one or more of the following issues: 1) they break existing code; 2) they have security problems and make it easier for poorly written code to overwrite memory; and 3) their behavior is unpredictable (i.e., faulty code make work some of the time). When they do expose problematic code, the problem is difficult to diagnose.

A traditional memory allocator may handle a zero-length allocation in any of a number of different ways. For example, it may return a NULL (i. e., treat it as a failed allocation). This can break existing coding patterns that use zero-length allocations as normal cases in loops or user inputs. Though these coding patterns are arguably risky, they are pervasive in existing C/C++ code and perfectly safe if implemented correctly.

Another approach is to return the smallest possible allocation (i.e., treat the request as 1 byte instead of 0 bytes). This allows the existing C/C++ code to work, but has the drawback that it allows poorly written code to read to and write from the memory allocation. The may cause a runtime failure sporadically depending on the contents of memory surrounding the allocation. Additionally, this has security implications as any attempt to write to this memory location is, by definition, a memory corruption and buffer-overrun.

Still another approach is to return a well-known address. Previous versions of MICROSOFT EXCHANGE, for example, improve on this by returning a constant (like 0x00000001, for example) that points to memory that can neither be written to or read from. If improperly written code accesses this address an access violation occurs and the problem can be diagnosed. Though this is an improvement on the above methods, it has the following drawbacks. First, any constant value that is guaranteed to be inaccessible on any running system will have the drawback of being innocuous (like the number 1). Developers who see this in a problem report may not realize that this constant is associated with a zero-length allocation. Also, though the code that references that invalid memory address is often at fault, there are also cases where the code that does the allocation is at fault and is not near the code accessing the memory (like when the allocation is passed across an API boundary). This requires a customer to reproduce the problem with additional diagnostics enabled.

SUMMARY

Methods for handling zero-length allocations are described and claimed herein. An example of such a method may include returning a self-describing/diagnosing dynamic address that has all the properties required for a secure implementation. For example, instead of returning a constant and well-known address, a dynamic address may be returned. Such a dynamic address may have the following properties: it cannot be read from, it cannot be written to, and it describes the problem to a developer in an obvious fashion.

Another example of such a method may include returning a series of different addresses (instead of a single address per process) to improve supportability. Instead of returning a single, invalid address, a range of invalid addresses maybe returned so that a developer can differentiate among possible different sources of the allocation.

Yet another example may include maintaining diagnostic information about the original allocation for ease of problem resolution. For example, a record of each zero-byte allocation may be maintained, as well as the callstack of the code that requested it. This allows for complete identification of who allocated the memory and who accessed it.

DETAILED DESCRIPTION

Figure 1:
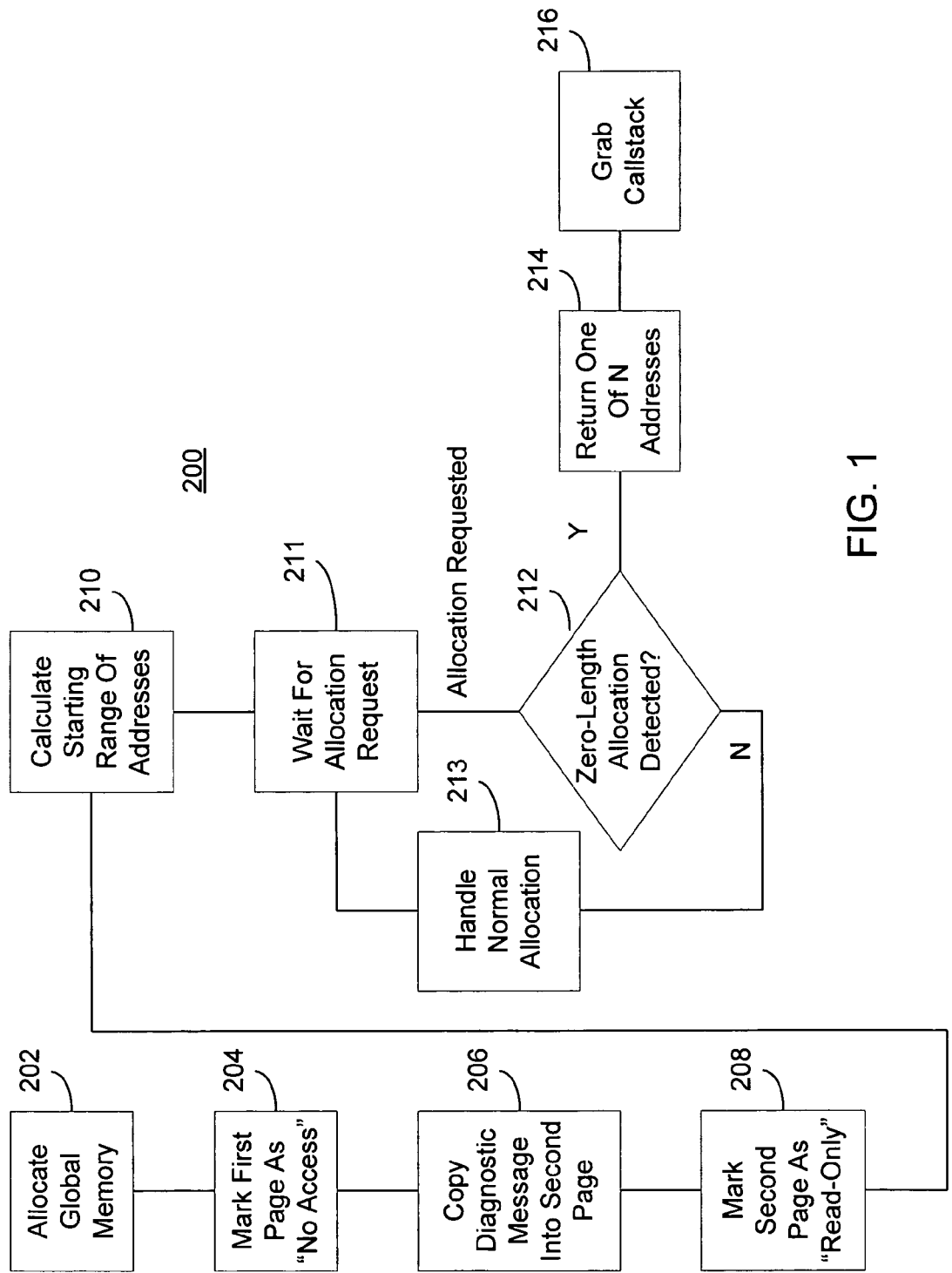
FIG. 1 is a flowchart of an example method for runtime detection for invalid use of zero-length memory allocation.

Runtime detection for invalid use of zero-length memory allocation may be accomplished by reserving/allocating two memory pages side-by-side. The first page may be configured to disable reading from and writing to. The second page may be read-only, and may contain a message that describes this as a zero-byte allocation. FIG. 1 is a flowchart of an example MICROSOFT WINDOWS-based implementation of a method 200 for runtime detection for invalid use of zero-length memory allocation.

At 202, global memory may be allocated. At least two contiguous pages of memory may be allocated. Two pages of contiguous memory are desirable because a page is the smallest unit of memory that can have unique access characteristics like read only, read-write, or no access, for example. One page may be provided to have certain desired security characteristics (e.g., any attempt to read from or write to the memory will fail). At least one additional page is desirable to contain a diagnostic message for developers to understand why an attempt to read or write failed. The pages may be contiguous so developers will see the diagnostic message when a failure on the first page occurs. A third page may be allocated for extra buffer. A multi-page region of memory may be defined, in C++ syntax, according to:

BYTE g_pbZeroByteAllocation [3*PAGE_SIZE], for example, where PAGE_SIZE may be about 4 k bytes of memory.

During initialization, at 204, the first page of this multi-page region may be marked as "no access." That is, the first page may be marked such that it cannot be read from nor written to. For example, the first page may be set to PAGE_NOACCESS using VirtualProtect().

At 206, a diagnostic message may be written into the second page. The diagnostic message may, for example, indicate that a zero-byte allocation has been requested. In general, the diagnostic message may be any message that indicates to a developer looking at this particular memory address that something has happened that requires attention.

At 208, the second page (and subsequent pages if more than two were allocated at 202 above) may be marked as "read only" so that the message cannot be corrupted if the memory is accessed. For example, the second page may be set to PAGE_READWRITE, using VirtualProtect().

It should be understood that a zero-length allocation request is not necessarily a bad thing. In a non-zero allocation, the developer allocates memory that is expected to be needed memory for storage of, say, email. For example, say it is presumed that an email is going to be less than 256 characters. The developer can declare up from that an email is going to be less than 256 characters, and this will be statically defined at compile time. Alternatively, this can be done dynamically. Memory can be allocate off the stack, directly from virtual memory. A heap may also be used.

In a zero-length allocation, the developer declares that he wants memory of size zero. This might occur because there are certain programming styles that do not treat zero as a special case. In other words, it is expected that a zero can be passed, and things will take care of themselves. Also, in some environments, legacy code may exist that makes it untenable for developers to go back and check for zero-passing.

If the value returned in response to the zero-length allocation request is used properly, then the program will keep right on working fine. If the returned value is used improperly by either reading from or writing to the allocated memory, then the program may crash. When a crash occurs, the developer will typically dump a memory location that is sent back from the program. This may not provide the developer with enough information to diagnose the root cause of the crash. It may not be immediately obvious that the crash is related to the improper use of a buffer returned by a zero-length allocation. A debugger will typically display that location, plus some number of bytes that follow that location. It is desirable, therefore, if an improper zero-byte allocation is requested, to provide the debugger with a global address that enables the debugger to display at least a portion of the diagnostics message that was written into the second page at 206. It may be desirable to display the entire diagnostics message, or at least enough of the message to pique the developer's interest (i.e., to make the developer want to look at the rest of the message to find out what is going on).

Figure 2:
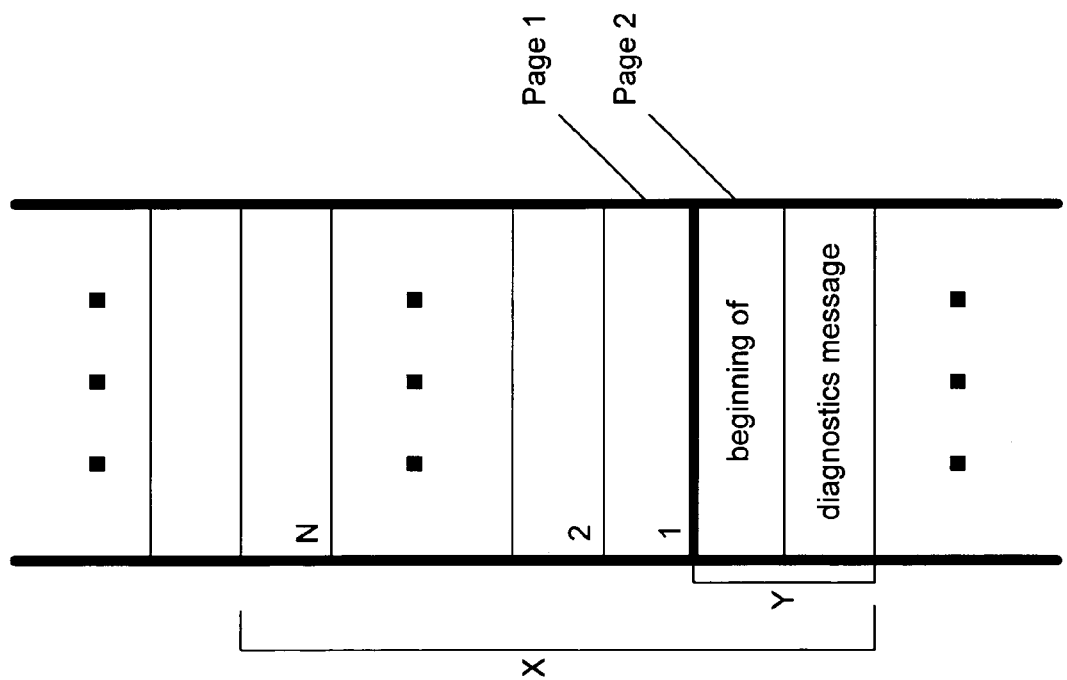
FIG. 2 depicts two contiguous memory pages.

Accordingly, at 210, a range of N addresses may be calculated such that, if an improper zero-length allocation request is received, the program will return one of the N addresses as a starting address that enables the debugger to display all or part of the diagnostics message. Suppose it is desirable for the diagnostics tool to display at least some number of bytes Y of the diagnostic message (e.g., as shown in FIG. 2, Y=2). Suppose further than the diagnostics tool can display only X bytes. N may be calculated as X−Y, and represents a number of bytes on the first page that can be used as a starting location for display of the desired portion of the diagnostics message. Thus, the range of addresses N may be a subset of the addresses that define the first page.

Figures 3, 4:
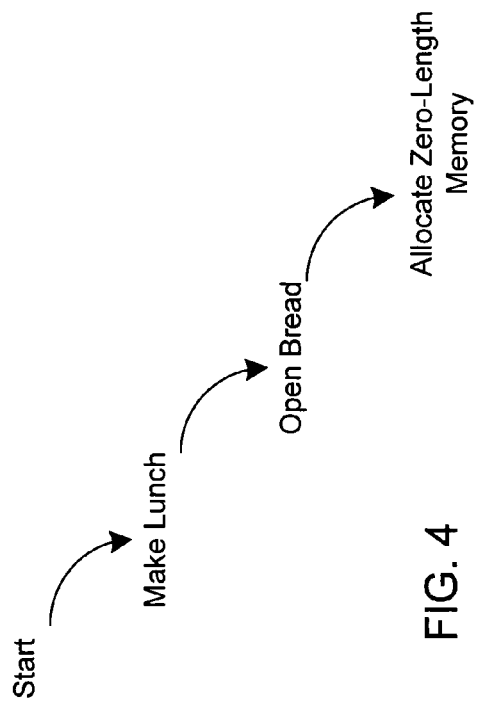
FIG. 3 provides example output of a diagnostics tool.
FIG. 4 depicts an example callstack.

At 211, the program waits for an allocation request. If the allocation is a normal allocation, then, at 213, the request is handled normally. If, at 212, an invalid zero-length allocation is detected, then, at 214, one of the N global addresses may be returned from the first page. As described in detail above, N may be small enough such that typical debugger commands will show the start of the diagnostic message on the second page. To calculate which of the N addresses to return, one may choose to keep a global counter of zero-length allocations, and determine which address to return by calculating that count modulo N (i.e., "cZeroLenghAllocations % N"). FIG. 3 provides an example output of such an allocation in the debugger.

At this point, the developer can determine what went wrong, and who is doing the improper thing with the address. However, at this point, the developer cannot necessarily be sure who requested the zero-length allocation in the first place. Frequently, it is not the fault of person who is using the memory, but of the person who allocated it. For example, a misuse might occur long after the program requests the address. In such an example, the program later goes to do something with the address, but it cannot, so it crashes.

Accordingly, at 216, standard diagnostic utilities may be used to grab a callstack of the calling code and store it in a global circular buffer along with information like which specific address was returned, for example. The call-stack identifies exactly who allocated each address. More than one person might have allocated the address. The call-stack enables the developer to home in who it was who requested the allocation.

FIG. 4 depicts an example callstack for a program for making a sandwich. As shown, functions call other functions. For example, function START calls function MAKE LUNCH, which calls function OPEN BREAD. Function OPEN BREAD calls function ALLOCATE ZERO-LENGTH MEMORY. Thus, the callstack provides a "history" of how the program got to where it is when it breaks so that the developer can determine who requested the improper zero-length memory allocation, and why it was requested. From that information, the developer can determine what needs to be fixed.

Example Computing Environment

Figure 5:
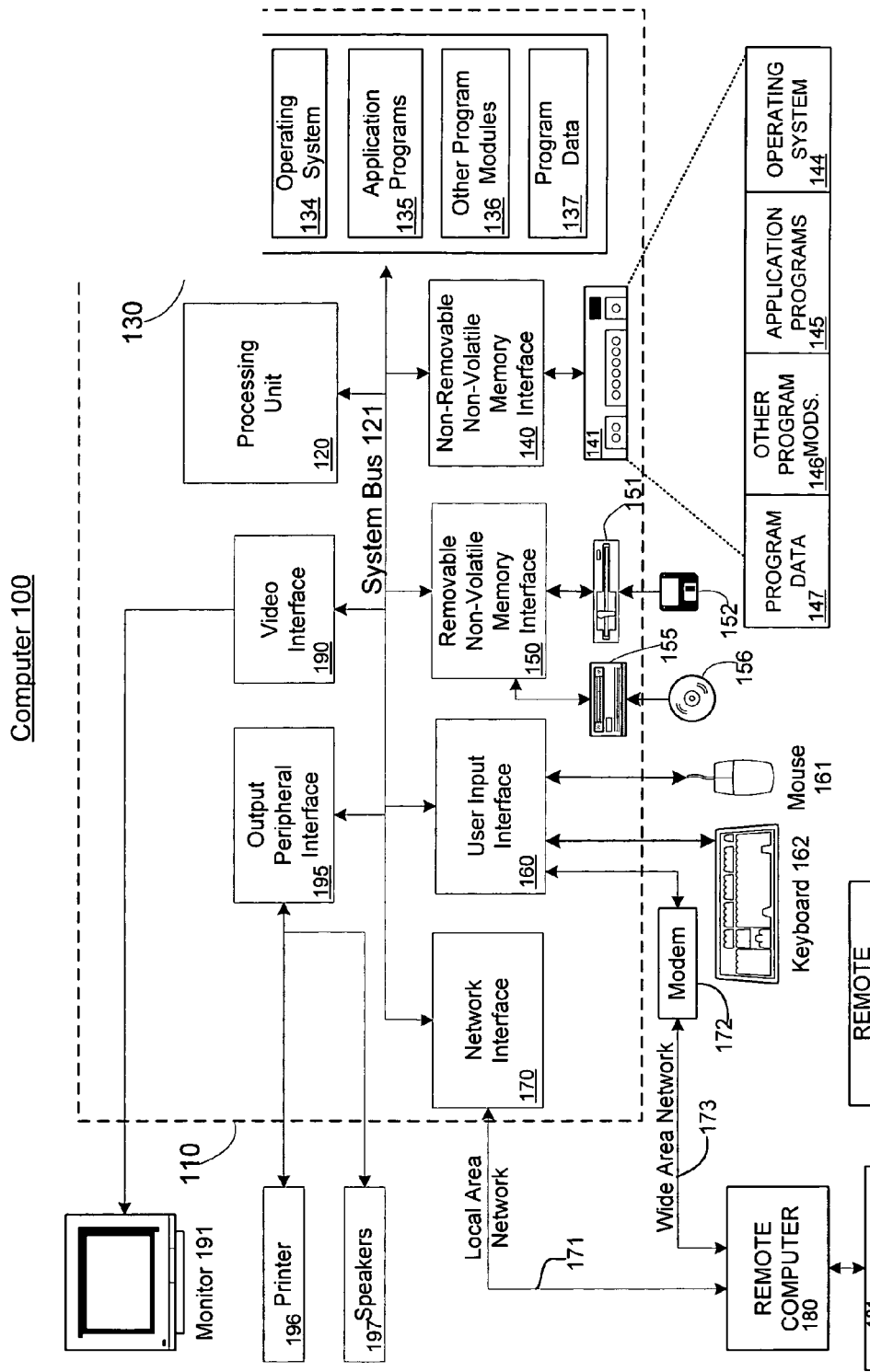
FIG. 5 is a block diagram showing an example computing environment in which aspects of the invention may be implemented.

FIG. 5 and the following discussion are intended to provide a brief general description of a suitable computing environment in which an example embodiment of the invention may be implemented. It should be understood, however, that handheld, portable, and other computing devices of all kinds are contemplated for use in connection with the present invention. While a general purpose computer is described below, this is but one example. The present invention also may be operable on a thin client having network server interoperability and interaction. Thus, an example embodiment of the invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer or tester, and/or included within the network browsing software which will be described in the general context of computer-executable instructions, such as program modules, being executed by one or more computers (e.g., client workstations, servers, or other devices). Generally, program modules include routines, programs, objects, components, data structures and the like that perform particular tasks or implement particular abstract data types. Typically, the fuinctionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessorbased systems, programmable consumer electronics, network PCs, minicomputers, mainframe computers, and the like. An embodiment of the invention may also be practiced in distributed computing environments where tasks are performed by remote processing devices that are linked through a communications network or other data transmission medium. In a distributed computing environment, program modules may be located in both local and remote computer storage media including memory storage devices.

FIG. 5 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 5, an example system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, random access memory (RAM), read-only memory (ROM), Electrically-Erasable Programmable Read-Only Memory (EEPROM), flash memory or other memory technology, compact disc read-only memory (CDROM), digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above should also be included within the scope of computer readable media.

The system memory 130 includes computer storage media in the form of volatile and/or nonvolatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 5 illustrates operating system 134, application programs 135, other program modules 136, and program data 137. RAM 132 may contain other data and/or program modules.

The computer 110 may also include other removable/non-removable, volatile/nonvolatile computer storage media. By way of example only, FIG. 5 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 5 provide storage of computer readable instructions, data structures, program modules and other data for the computer 110. In FIG. 5, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120a-f through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 5. The logical connections depicted in FIG. 5 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 5 illustrates remote application programs 185 as residing on memory device 181. It will be appreciated that the network connections shown are exemplary and other means of establishing a communications link between the computers may be used.

One of ordinary skill in the art can appreciate that a computer 110 or other client devices can be deployed as part of a computer network. In this regard, the present invention pertains to any computer system having any number of memory or storage units, and any number of applications and processes occurring across any number of storage units or volumes. An embodiment of the present invention may apply to an environment with server computers and client computers deployed in a network environment, having remote or local storage. The present invention may also apply to a standalone computing device, having programming language functionality, interpretation and execution capabilities.

What is claimed:

1. A method for runtime detection of improperly used zero-length memory allocation, the method comprising:
   allocating an amount of global memory;
   manipulating the memory such that improper use thereof can be detected at run-time;
   providing a reference to at least a portion of the memory as a result to a zero-length memory allocation;
   detecting a code defect associated with an improper use of the zero-length memory allocation;
   storing a diagnostic message in a portion of the memory; and calculating a starting address in the memory such that the starting address enables a debugger to display at least a portion of the diagnostic message if an improper zero-length allocation is detected.

2. The method of claim 1, wherein the global memory comprises at least two contiguous pages of memory.

3. The method of claim 2, further comprising:
   marking the first page such that it cannot be accessed.

4. The method of claim 2, further comprising:
   marking the second page such that it cannot be written to.

5. The method of claim 1, wherein calculating the starting address comprises calculating the starting address based on a number of bytes that would normally be displayed by the debugger.

6. The method of claim 1, wherein calculating the starting address comprises calculating the starting address based on a number of bytes that form the portion of the diagnostic message.

7. The method of claim 1, wherein calculating the starting address comprises calculating each of a plurality of starting addresses that enable the debugger to display at least a portion of the diagnostic message if an improper zero-length allocation is detected.

8. The method of claim 7, further comprising:
   providing one of the plurality of starting addresses as a result to a zero-length memory allocation.

9. The method of claim 8, further comprising:
   determining which of the plurality of addresses to provide by maintaining a count of zero-length allocations and returning the Nth address, where N is a calculated number of allocations modulo a number of possible return addresses from the calculated plurality of addresses.

10. A method for diagnosing improper zero-length memory allocation, the method comprising:
    detecting an improper zero-length memory allocation; and responsive to detecting the improper zero-length memory allocation, providing to a debugger an address associated with a first page of global memory such that the debugger displays at least a portion of a diagnostic message written into a second page of global memory when the debugger displays the provided address, wherein the address is one of:
    calculated based a number of bytes that can be displayed by the debugger;
    calculated based a number of bytes that form the portion of the diagnostic message;
    selected from a plurality of starting addresses on the first page that enable the debugger to display at least a portion of the diagnostic message if an improper zero-length allocation is detected;
    or selected from the plurality of starting addresses by maintaining a total count of zero-length allocations and returning the Nth address, where N is a calculated number of allocations modulo a number of possible return addresses from the calculated plurality of addresses.

11. The method of claim 10, wherein the first and second pages are contiguous, and the address is within a certain number of bytes of the portion of the diagnostic message to be displayed.

* * * * *

UNITED STATES PATENT AND TRADEMARK OFFICE
CERTIFICATE OF CORRECTION

PATENT NO. : 7,730,453 B2
APPLICATION NO. : 11/300227
DATED : June 1, 2010
INVENTOR(S) : Michael Luther Swafford Page 1 of 1

It is certified that error appears in the above-identified patent and that said Letters Patent is hereby corrected as shown below:

In Drawings; sheet 4 of 4, figure 5, line 1, above " 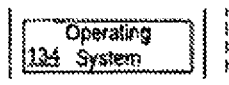 " insert

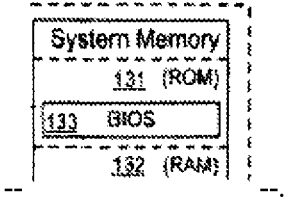

Signed and Sealed this
Twenty-fifth Day of January, 2011

David J. Kappos
*Director of the United States Patent and Trademark Office*